It is

United States Patent [19]

Ito

[11] Patent Number: 5,909,599
[45] Date of Patent: Jun. 1, 1999

[54] INFORMATION RECORDING MECHANISM FOR CAMERA

[75] Inventor: Toru Ito, Saitama, Japan

[73] Assignee: Fuji Photo Optical Co., LTD., Saitama, Japan

[21] Appl. No.: 08/921,614

[22] Filed: Sep. 2, 1997

[30] Foreign Application Priority Data

Sep. 18, 1996 [JP] Japan .................................. 8-246356

[51] Int. Cl.⁶ .................................................. G03B 17/24
[52] U.S. Cl. ............................................................ 396/318
[58] Field of Search .............................. 396/310, 315–318

[56] References Cited

U.S. PATENT DOCUMENTS

| 5,182,590 | 1/1993 | Kaihara et al. | 396/318 |
| 5,339,123 | 8/1994 | Soshi et al. | 354/106 |
| 5,349,402 | 9/1994 | Soshi et al. | 354/106 |
| 5,398,088 | 3/1995 | Yamazaki et al. | 354/106 |
| 5,532,776 | 7/1996 | Miyamoto et al. | 354/106 |
| 5,534,957 | 7/1996 | Miyamoto et al. | 354/106 |
| 5,534,958 | 7/1996 | Miyamoto et al. | 354/106 |
| 5,539,486 | 7/1996 | Miyamoto et al. | 354/106 |
| 5,552,844 | 9/1996 | Miyamoto et al. | 354/106 |
| 5,555,467 | 9/1996 | Miyamoto et al. | 354/106 |
| 5,557,354 | 9/1996 | Miyamoto et al. | 354/106 |

*Primary Examiner*—David M. Gray
*Attorney, Agent, or Firm*—Leydig, Voit & Mayer, Ltd.

[57] ABSTRACT

An information recording mechanism for recording information onto a film surface from the front side of the film provides a light emitter for emitting, as light, the information to be recorded on the film; a light emitter mounting substrate for mounting the light emitter thereon; an optical stop for narrowing the light emitted from the light emitter; and an optical member for causing the light narrowed by the optical stop to become incident on the film surface. The optical stop is integrally formed with the camera body part, while the light emitter mounting substrate and the optical member are directly attached to the camera body part without substantially generating positional shifts, thereby improving operability for assembling the camera.

7 Claims, 4 Drawing Sheets

INFORMATION RECORDING MECHANISM FOR CAMERA

BACKGROUND OF THE INVENTION

1. Field of the Invention

The present invention relates to an information recording mechanism for a camera and, in particular, to such mechanism for recording information such as date onto a film surface.

2. Related Background Art

Conventionally, in order to record information such as date onto a film surface, an information recording mechanism is disposed on the back cover side of the camera, i.e., on the back side of the film, so as to record such information onto the film surface from the back side thereof.

In order to reduce the thickness of the camera itself, however, recently has been employed is a system in which an information recording mechanism is disposed on the front side of the film so as to record information such as date from the front side of the film.

As shown in FIG. 4, this information recording mechanism comprises pieces of light emitters 50 corresponding to the number of dots in a row required when characters for a date or the like to be recorded on the film are indicated in terms of dots; an optical stop 52 for narrowing the light emitted from the light emitters 50; and an optical member 56 for causing the light narrowed by the optical stop 52 to become incident on a surface of a film 54. While this information recording mechanism is used, the light emitters 50 are turned on and off in response to the feeding of the film, whereby the date or the like is recorded onto the film surface.

In this information recording mechanism, an exit opening 58 for guiding the light emitted from the optical member 56 onto the film surface is formed in a camera body 60. On the other hand, the optical member 56 and a stop member 62 including the optical stop 52 is attached to the camera body 60 from thereabove (from the upper side of the drawing). Also, a light emitter holding member 64 having the light emitters 50 is attached to the camera body 60. Accordingly, when each of the light emitters 50, optical member 56, and stop member 62 is being attached to the camera body 60, a shift in attachment may occur, thereby tilting or obscuring the characters, or lowering the quantity of light such that the characters cannot be recorded.

Also, since the optical member 56 and the stop member 62 are disposed at the bottom of a deep hole, it is difficult for them to be accurately attached there, thus deteriorating operability.

SUMMARY OF THE INVENTION

It is an object of the present invention to provide an information recording mechanism for a camera, which prevents the light emitters, stop, and optical member constituting the information recording mechanism from positionally shifting, keeps characters from being tilted, obscured, or the like, and is excellent in operability when being assembled.

The present invention provides an information recording mechanism for a camera for recording information onto a film surface from the front side of the film, the information recording mechanism comprising:

a light emitter for emitting, as light, the information to be recorded on the film;

a light emitter mounting substrate for mounting the light emitter thereon;

an optical stop for narrowing the light emitted from the light emitter; and an optical member for causing the light narrowed by the optical stop to become incident on the film surface;

wherein the optical stop is integrally formed with a body part of the camera, while the light emitter mounting substrate and the optical member are directly attached to the body part of the camera.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

Figure 1:
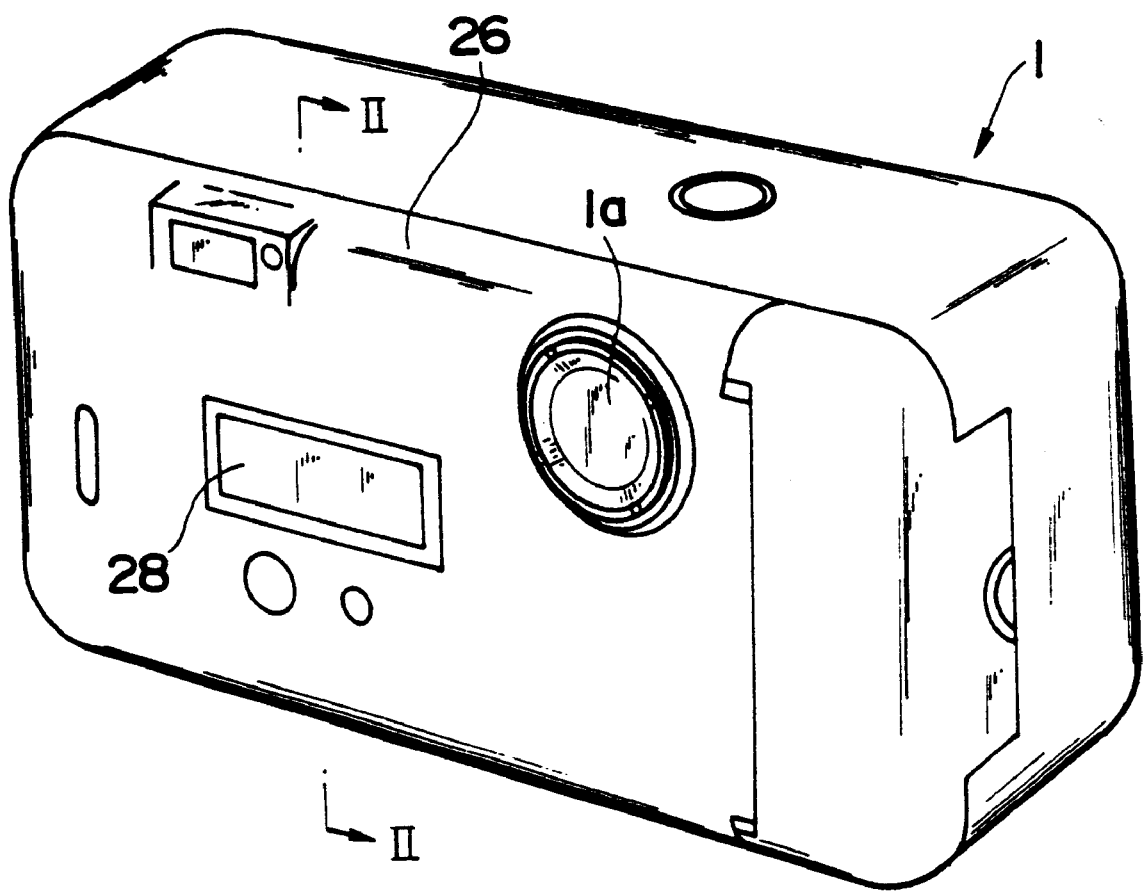
FIG. 1 is a perspective view showing a camera providing the information recording mechanism in accordance with an embodiment of the present invention.
Figure 2:
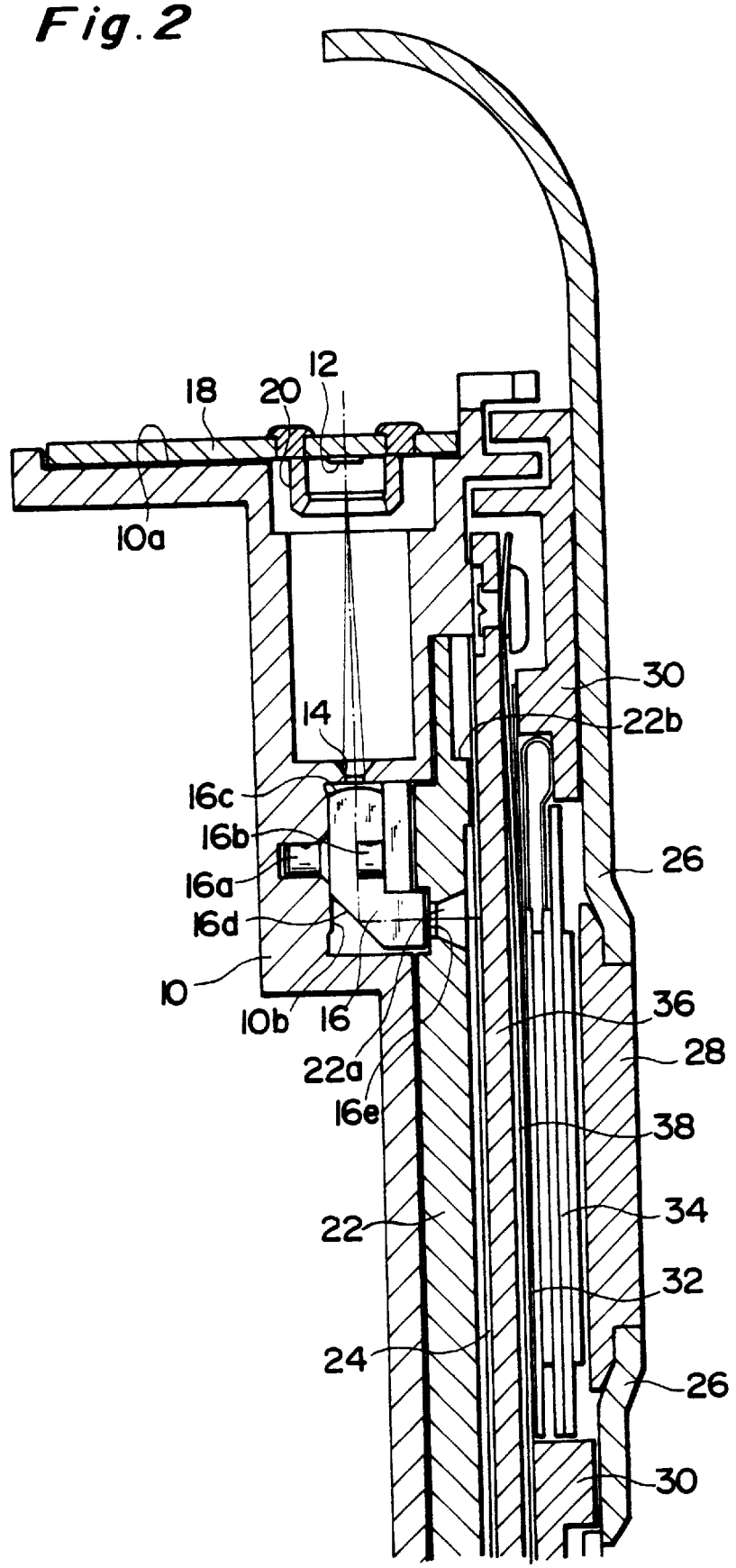
FIG. 2 is a partially sectional view taken along line II—II in FIG. 1.

In the following, the information recording mechanism for a camera in accordance with an embodiment of the present invention will be explained with reference to FIGS. 1 to 3. FIG. 1 is a perspective view showing the back face of a camera providing the information recording mechanism in accordance with an embodiment of the present invention, whereas FIG. 2 is a partially sectional view taken along line II—II in FIG. 1.

In these drawings, the back face of a camera 1 is provided with a back cover 26, which has a mode-selecting switch 1a, a window member 28, and the like. Directly attached to a camera body part 10 are a light emitter mounting substrate 18 and an optical member 16. Also, an optical stop 14 is integrally formed with the camera body part 10.

Namely, the camera body part 10 is provided with an attaching section 10a for the light emitter mounting substrate 18, and the latter is screwed onto the attaching section 10a. A light emitter cover 20 is attached to the substrate 18. Linearly arranged inside the light emitter cover 20 are pieces of LEDs 12 corresponding to the number (e.g., 7 pieces) of dots in a row required when information such as date is expressed as dot data.

Also, in the camera body part 10, on the exit side of the LEDs 12, the optical stop 14 for eliminating a surplus part of the light emitted from the LEDs 12 is disposed Further, the camera body part 10 is provided with an optical member attaching section 10b to which the optical member 16 for causing the light narrowed by the optical stop 14 to become incident on a film surface, which will be explained later, is attached.

Figure 3:
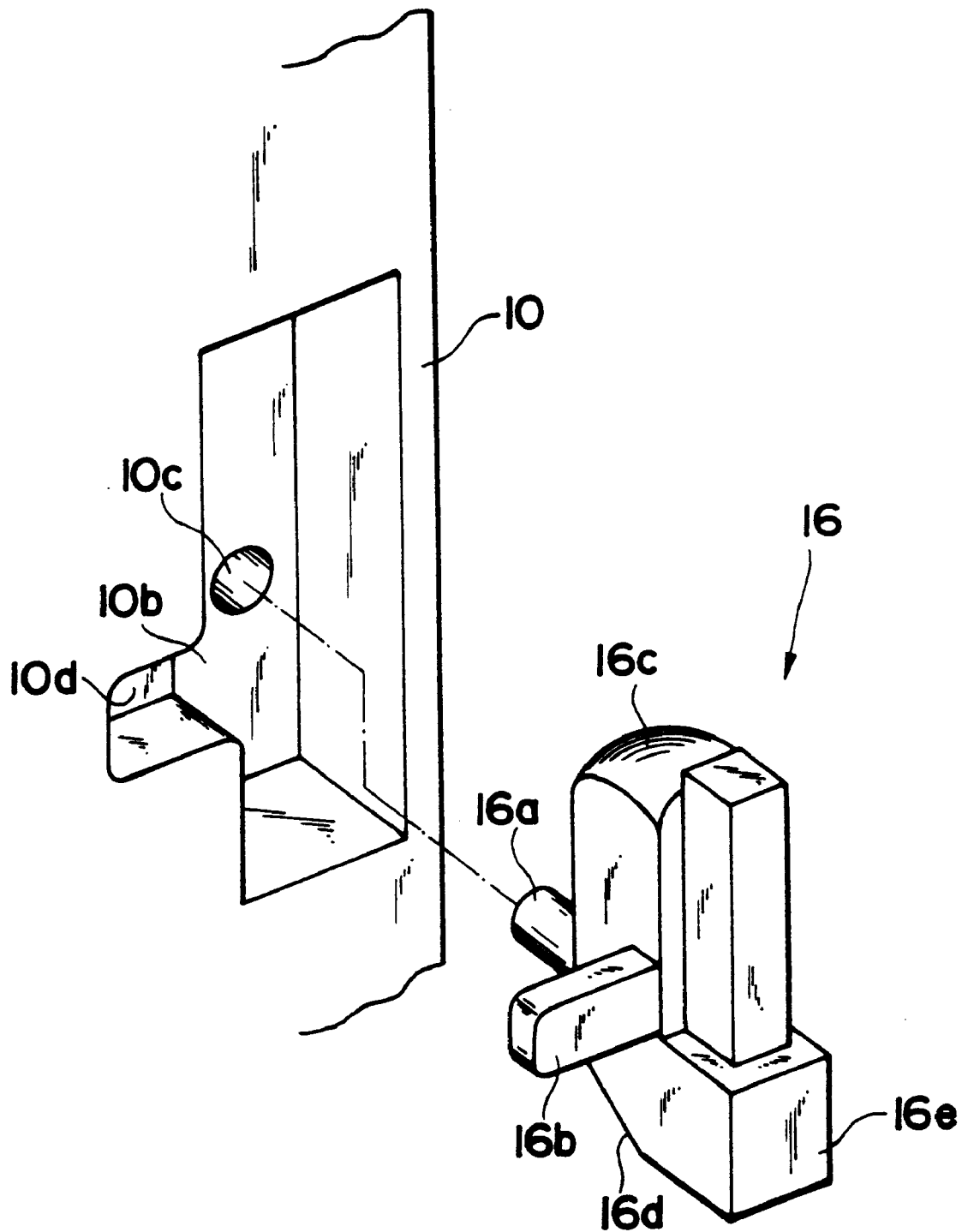
FIG. 3 is a view showing the state in which the optical member in accordance with the embodiment is being attached to the body part of the camera.
Figure 4:
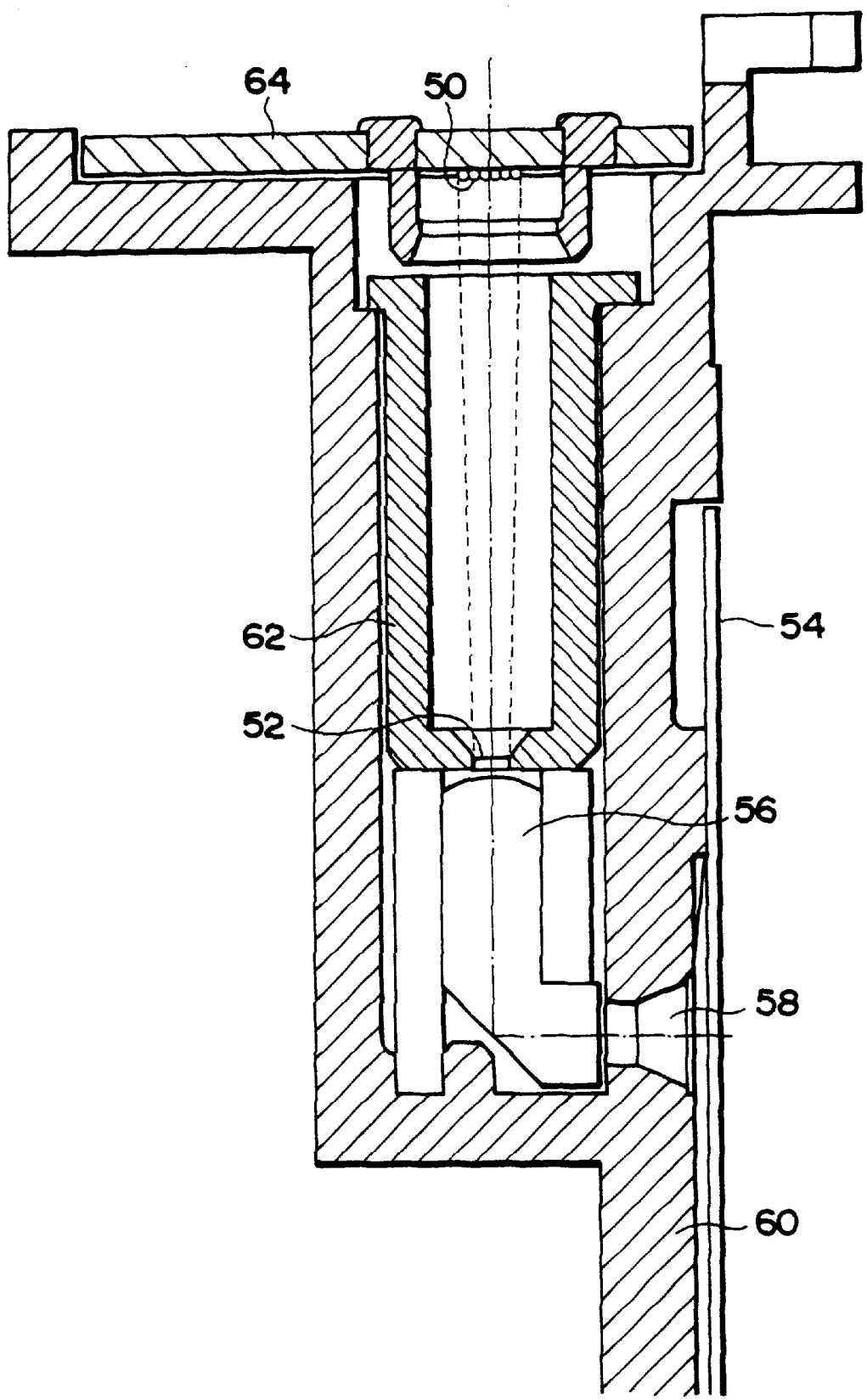
FIG. 4 is a sectional view showing a conventional information recording mechanism for a camera.

FIG. 3 is a view showing the state in which the optical member 16 is being attached to the camera body part 10. The optical member 16 has an entrance surface 16c on which the light emitted from the LEDs 12 is made incident through the optical stop 14, a reflecting surface 16d for reflecting the incident light toward the film, and an exit surface 16e for emitting the light toward the film.

Also, the optical member 16 has a positioning boss 16a and a rotation stopper arm 16b. On the other hand, the camera body part 10 has the optical member attaching section 10b provided with a positioning hole 10c and a rotation stopper arm holding portion 10d. When the positioning boss 16a is inserted into the positioning hole 10c of the optical member attaching section 10b, while the rotation stopper arm 16b is fitted into the rotation stopper arm holding portion 10d, from behind the camera, i.e., from the back face side, the optical member 16 is positioned with respect to the optical member attaching section 10b.

After being positioned at the optical member attaching section 10b, the optical member 16 is secured when an optical member lid 22 having a film guide bored with a hole 22a slightly larger than the effective diameter of the exit surface 16e of the optical member 16 is screwed onto the camera body part 10 from therebehind. Here, the optical member lid 22 has, on its surface not in contact with the camera body part 10, a guide rail 22b for guiding a film 24.

The window member 28 made of acrylic resin is attached to the back cover 26 of the camera 1. Secured to an inner side face of the back cover 26 is an inner frame 30 for securing a flexible printed circuit board 32, on which functional parts such as electric circuit board components and switches are disposed, an LCD 34 for displaying a date, and the like to the inside of the back cover 26.

Also attached to the inner frame 30 are a platen 36 and a leaf spring 38. As the leaf spring 38 presses the platen 36 toward the optical member lid 22, a gap for allowing the film 24 to pass therethrough is formed between the platen 36 and the film guide 22b formed in the optical member lid 22.

When a date is to be recorded on the film 24 by means of the information recording mechanism in accordance with this embodiment, the LEDs 12 are controlled by a non-depicted microcomputer so as to be turned on and off in synchronization with the feeding of the film 24. Through the optical stop 14, the light emitted from the LEDs 12 corresponding to the character information representing the date is made incident on the optical member 16 from its entrance surface 16c. The light incident on the optical member 16 is reflected by the reflecting surface 16d toward the film 24 so as to be emitted from the exit surface 16e. The light emitted from the exit surface 16e is transmitted through the hole 22a bored in the film guide 22 so as to be made incident on the surface of the film 24 from its front side. Thus, the date is recorded onto the film surface.

As explained in the foregoing, in this information recording mechanism, the optical stop 14 is integrally formed with the camera body part 10, while the light emitter mounting substrate 18 and the optical member 16 are directly attached to the camera body part 10 without any other members intervening therebetween. Accordingly, when the light emitted from the LEDs 12 is made incident on the film 22 by way of the optical stop 14 and the optical member 16 so as to record the date onto the film surface, the LEDs 12, the optical stop 14, and the optical member 16 do not positionally shift, whereby the characters representing the date recorded on the film can be prevented from being tilted, obscured, or the like.

Also, since the optical member 16 is attached to the camera body part 10 from therebehind, i.e., from the back cover side, the operation for attaching the optical member 16 to the camera body part 10 is facilitated.

Though the case where the date is recorded on the film surface is explained as an example in the above-mentioned embodiment, the present invention is applicable to the recording of not only the date but also any information such as message.

In accordance with the present invention, the optical stop is integrally formed with the camera body part, while the light emitter and the optical member are directly attached to the camera body part without any other members intervening therebetween. Accordingly, when the light emitted from the light emitter is made incident on the film by way of the optical stop and the optical member so as to record information on the film surface, the light emitter, the optical stop, and the optical member do not positionally shift, whereby the characters recorded on the film surface can be prevented from being tilted, obscured, or the like, thus allowing the quality of recorded image to improve. Also, the operability for assembling the camera can be improved.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Application No. 246356/1996 filed on Sep. 18, 1996 is hereby incorporated by reference.

What is claimed is:

1. An information recording mechanism for a camera for recording information onto a film surface from a front side of the film, said information recording mechanism comprising:

a light emitter for emitting, as light, the information to be recorded on said film;

a light emitter mounting substrate for mounting said light emitter thereon;

an optical member for causing light from said light emitter to become incident on said film surface and including a reflecting surface for changing a direction of light from, said light emitter; and an optical stop disposed between said light emitter and said optical member for limiting the amount of light from said light emitter incident on said optical member, wherein said optical stop is integrally formed with a body part of said camera, said light emitter mounting substrate and said optical member being directly attached to said body part.

2. An information recording mechanism for a camera according to claim 1, wherein said optical member has a positioning boss and a rotation stopper arm, said body part having an attaching section for said optical member, said attaching section comprising a positioning hole and a rotation stopper arm holding portion; and wherein said positioning boss is inserted into said positioning hole while said rotation stopper arm is fitted into said rotational stopper arm holding portion, thereby said optical member is positioned at said attaching section.

3. An information recording mechanism for a camera according to claim 2, wherein said positioning hole is formed in said body part from a rear side to front side of said camera.

4. An information recording mechanism for a camera according to claim 2, further comprising a lid for said optical member, said lid having a hole for guiding said light emitted from said optical member to said film surface, said lid being attached to said body part from behind said camera;

wherein said optical member positioned at said attaching section is secured by said lid.

5. An information recording mechanism for a camera according to claim 4 wherein said lid has, on a face not in contact with said body part, a guide rail for guiding said film.

6. An information recording mechanism for a camera according to claim 1, wherein light from said light emitter can reach said optical stop without passing through any intermediate member modifying the light reaching the optical stop.

7. An information recording mechanism for a camera according to claim 1, wherein said optical stop comprises an aperture having a diameter which decreases with increasing distance from said light emitter.

\* \* \* \* \*